United States Patent
Marc

(10) Patent No.: US 8,840,348 B2
(45) Date of Patent: Sep. 23, 2014

(54) SELF-LOCKING SCREWING ATTACHMENT DEVICE AND ASSEMBLY PROVIDED WITH SAME

(75) Inventor: Damien Marc, Nangis (FR)

(73) Assignee: JPB Systeme, Brie-Comte-Robert (FR)

( * ) Notice: Subject to any disclaimer, the term of this patent is extended or adjusted under 35 U.S.C. 154(b) by 204 days.

(21) Appl. No.: 13/505,922

(22) PCT Filed: Nov. 3, 2010

(86) PCT No.: PCT/FR2010/052358
§ 371 (c)(1),
(2), (4) Date: May 3, 2012

(87) PCT Pub. No.: WO2011/055077
PCT Pub. Date: May 12, 2011

(65) Prior Publication Data
US 2012/0213608 A1     Aug. 23, 2012

(30) Foreign Application Priority Data
Nov. 5, 2009   (FR) ...................................... 09 57838

(51) Int. Cl.
*F16B 39/24*          (2006.01)
(52) U.S. Cl.
USPC .......................................... 411/143; 411/956
(58) Field of Classification Search
USPC ............. 411/143, 108, 120, 956, 961; 285/92
IPC ....................................................... F16B 39/24
See application file for complete search history.

(56) References Cited

U.S. PATENT DOCUMENTS

| | | | | |
|---|---|---|---|---|
| 1,646,805 A | * | 10/1927 | Bell | 411/329 |
| 5,851,035 A | * | 12/1998 | Marc et al. | 285/86 |
| 5,897,277 A | | 4/1999 | Barré et al. | |
| 2006/0151994 A1 | * | 7/2006 | Marc et al. | 285/92 |

FOREIGN PATENT DOCUMENTS

CH              29609 A        9/1904

OTHER PUBLICATIONS

European Patent Office; Search Report in International Patent Application No. PCT/FR2010/052358 dated Mar. 17, 2011; 4 pages.
French Patent Office; Search Report issued in French Patent Application No. FR 0957838 dated Jul. 8, 2010; 2 pages.

\* cited by examiner

*Primary Examiner* — Gary Estremsky
(74) *Attorney, Agent, or Firm* — Wood, Herron & Evans, LLP

(57) ABSTRACT

The invention relates to a self-locking screwing attachment device (1a, 1b) including a nut (2a, 2b) screwed onto a threaded tip (3a, 3b) extending in a screwing axis (X), characterized in that the nut (2a, 2b) includes: a first element (6a, 6b) rotating relative to the tip (3a, 3b) when screwing; a second element (13a, 13b) rotatably engaged with the tip (3b) or an adjacent part (5) to be assembled, the tip (3a) passing therethrough; a stop member (23a, 23b) rotatably secured to the first element (6a, 6b); a releasable coupling means (26a, 26b, 27a, 27b, 28a, 28b) between the stop member (23a, 23b) and the second element (13a, 13b), the nut also being provided with an area for direct clamping between a first clamping surface (20a, 20b) of the first element (6a, 6b) and a second clamping surface (21a, 21b) of the second element (13a, 13b), when the second element (13a, 13b) axially engages with the tip (3a, 3b) or said adjacent part (5) to be assembled.

17 Claims, 3 Drawing Sheets

SELF-LOCKING SCREWING ATTACHMENT DEVICE AND ASSEMBLY PROVIDED WITH SAME

FIELD OF THE INVENTION

The present invention relates to a self-locking screwing attachment device including a nut screwed onto a threaded tip.

The present invention also relates to an assembly of at least two parts attached to each other by such a device.

The self-locking attachment device has the object to prevent two parts from being importunately unscrewed with respect to each other, in particular in applications where both pieces are subjected when operated to vibrations or shakes. This is applicable to an assembly of three or more parts.

STATE OF THE ART

Self-locking screwing attachment devices for securing at least two parts to each other, having generally the form of a nut screwed onto a threaded tip, provided with strengthened releasable coupling means, for preventing said at least two parts from being importunately unscrewed, are known. This strengthened coupling means perform a self-locking of the coupling when screwing the nut on the tip.

These known devices generally have drawbacks of several kinds:
- the nut consists of several separable parts which can be lost and should be assembled according to an accurate order,
- nut not adapted to parts to be assemble and/or to threaded tips having multiple shapes and not necessarily standard; the friction surfaces required for the clamping are highly dependent on the shape of parts to be assembled, resulting in an uncertain clamping efficiency according to configurations; the adaption of these known nuts sometimes requires a significant and extensive machining,
- poorly optimized dimensions.

PURPOSE OF THE INVENTION

The purpose of the invention is to overcome all or part of the previous drawbacks by providing a self-locking screwing attachment device for attaching at least two parts to each other, which is compact, made as a single piece, adaptable to configurations and shapes of multiple non-standard parts, or demanding as little machining as possible.

OBJECT(S) OF THE INVENTION

For that purpose, one object of the invention is to provide a self-locking screwing attachment device including a nut screwed onto a threaded tip extending along a screwing axis, characterised in that the nut includes:
- a first element rotating relative to the tip during screwing;
- a second element rotatably engaged with the tip or an adjacent part to be assembled, the tip passing therethrough;
- a stop member rotatably secured to the first element;
- a releasable coupling means between the stop member and the second element, the nut also being provided with an area for direct clamping of a first clamping surface of the first element and a second clamping surface of the second element against each other, when the second element axially engages the tip or said adjacent part to be assembled.

Thus, the tightening force is perfectly controlled since it is conditioned by respective clamping surfaces of two constituent elements of the nut. Furthermore, only a rotating stop between the second element and an adjacent part or the threaded tip is to be provided, which generates a minimal machining of said adjacent part or tip, while ensuring a quite reliable locking, in view of the releasable coupling means provided.

According to other advantageous characteristics of the invention, the second element is movable in the axial direction X with respect to the first element, between an axial stop carried by the first element and the stop member, the latter being urged towards the second element by return means resting on the first element, and being driven in translation along the axis against the return means with respect to the first element, under the influence of the second element, as the nut is moved along the axis during screwing, when the second element axially engages the tip or said adjacent part to be assembled.

Due to the axial stop retaining the second element onto the first element, the nut has the form of a single unit, exempting different components from being gathered and assembled, which makes it particular simple to use.

According to yet other advantageous characteristics of the invention, the coupling means include axially directed teeth formed on the second element and on the stop member, interpenetrable when biased by the return means.

According to yet other advantageous characteristics of the invention, the first element includes an area for being rotatably engaged with a screwing tool, said area axially bounded by a back end of the nut with respect to the axial screwing direction, and by a shoulder formed on the periphery of the nut.

According to yet other advantageous characteristics of the invention, the nut includes a supporting cylinder fastened at its back end to a front face of the shoulder, a face of the front end of the cylinder making up the first clamping surface of the first element.

According to yet other advantageous characteristics of the invention, the stop member has generally an annular shape introduced into a throat having a substantially cylindrical shape, bounded on the one hand internally by a cylindrical portion substantially extending the area for rotatable engagement beyond the peripheral shoulder, in the screwing direction of the nut, and on the other hand externally by the supporting cylinder, the stop member further including rotating stop means consisting of at least one radial protrusion, for example having generally a dovetail shape axially sliding in a groove having a conjugated shape provided in the thickness of the supporting cylinder, a front face of the stop member with respect to the screwing direction supporting part of the teeth of the coupling means.

According to yet other advantageous characteristics of the invention, the second element has generally an annular shape a back face of which with respect to the screwing direction supports part of the teeth of the coupling means, the second element having an inner shoulder the radially inner profile of which is sandwiched between the axial stop and the stop member.

According to yet other advantageous characteristics of the invention, the second element includes at least one lug axially extending in the screwing direction of the nut, the lug being capable of introduction into a housing having a conjugated shape provided in the adjacent part to be assembled, so that the second element and said adjacent part are fast for common rotation together.

According to yet other advantageous characteristics of the invention, the return means are of the compression spring type, in particular of the wavy type.

According to yet other advantageous characteristics of the invention, the nut includes a supporting cylinder extending the area for rotatable engagement beyond the peripheral shoulder in the axial screwing direction of the nut, wherein a front end of the supporting cylinder includes a face making up the first clamping surface of the first element.

According to yet other advantageous characteristics of the invention, the stop member has generally an annular shape introduced into a throat having a substantially cylindrical shape, bounded on the one hand internally by the supporting cylinder, and on the other hand externally by a cover having generally a cylindrical shape secured to the peripheral shoulder and extending in the screwing direction up to a front end, the stop member further including rotating stop means consisting of at least one radial protrusion, for example having generally
a dovetail shape axially sliding in a groove having a conjugated shape provided in the thickness of the cover, a front face of the stop member with respect to the screwing direction supporting part of the teeth of the coupling means.

According to yet other advantageous characteristics of the invention, the second element has generally an annular shape a back face of which with respect to the screwing direction supports part of the teeth of the coupling means, the second element having an outer shoulder the radially outer profile of which is sandwiched between the axial stop and the stop member.

According to yet other advantageous characteristics of the invention, the second element includes at least one radially inner protrusion penetrating a groove provided on the tip, so as to set a key type slide link and thus rotatably secure the second element to the tip.

According to yet other advantageous characteristics of the invention, the return means are of the compression spring type, in particular a coiled spring.

According to yet other advantageous characteristics of the invention, the axial stop is formed by a shoulder, or a narrowed portion in particular made by crimping, extending radially to inside the nut so as to trap the second element in the throat.

Still another object of the invention is to provide an assembly between a support onto which is securely mounted a threaded tip and at least one adjacent part (5) through which the tip passes, characterised in that it includes a self-locking screwing attachment device having all or part of the preceding characteristics.

Still another object of the invention is to provide an assembly on a threaded tip of an adjacent part such as a pulley or a wheel, securely rotatably mounted on the tip, in particular via a key system, the adjacent
part being fitted onto the tip to the point of axially engaging a shoulder of the tip, characterised in that it includes a self-locking screwing attachment device having all or part of the preceding characteristics.

DETAILED DESCRIPTION

The invention will be better understood upon reading the description that follows of two non-limiting embodiments of the invention and in light of the appended drawings wherein:

FIGS. 1 and 2 represent an assembly of two parts provided with a screwing coupling device according to a first embodiment of the invention, respectively in a preassembled configuration and in an assembled configuration, FIG. 3 represents an enlarged view of FIG. 1 with a partial cross-section along a longitudinal cross-section plane, FIG. 4 represents a perspective view of the nut of FIG. 1 with one quarter cut away in the longitudinal direction, FIG. 5 represents an exploded view of the nut of FIG. 1.

Generally in the following description, the screwing of the nut is mentioned along an axial direction X, which is coextensive to the longitudinal axis of the threaded tip cooperating with the nut. The words "front" and "back" used throughout the text to structurally describe the invention should be understood in connection with this axial direction, and more precisely with the direction of movement of the nut when it is screwed onto the tip (screwing forwardly, unscrewing rearwardly).

Figure 1:
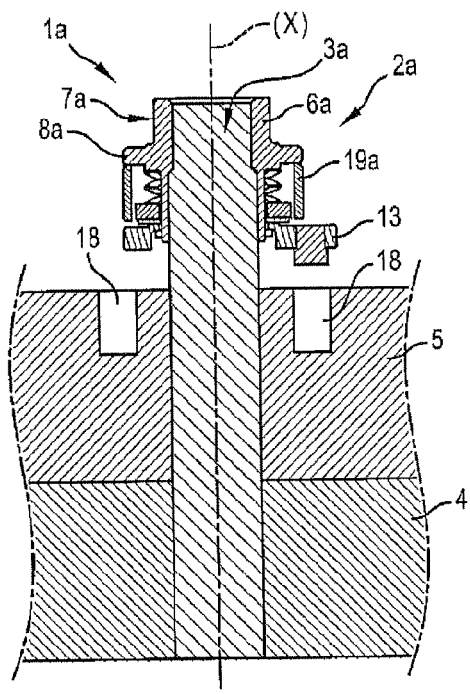
Figure 2:
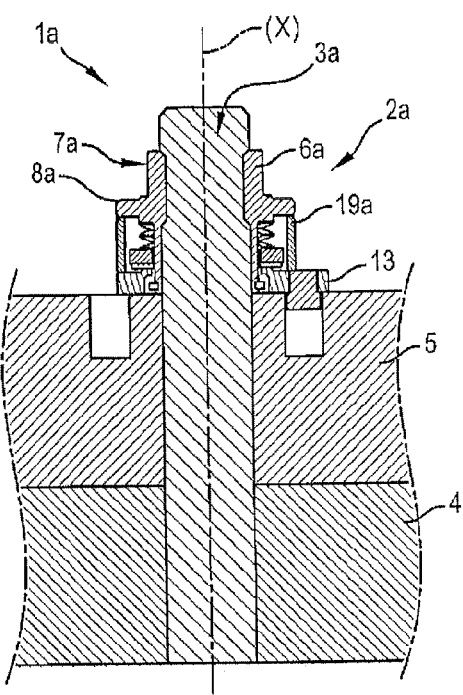

There is represented in FIGS. 1 and 2 a self-locking screwing attachment device 1a according to a first embodiment of the invention. This device includes a nut 2a screwed onto a threaded tip 3a (or strut) so as to ensure the attachment to each other of at least two parts, typically a supporting part 4 and an adjacent part 5, in the example represented. In this example, the threaded tip 3a is rigidly mounted in a bore of the supporting part 4. The adjacent part 5 has the tip 3a passing therethrough and is sandwiched between the supporting part 4 and the nut 2a. In an alternative not represented, the tip 3a can be provided with a shoulder resting against a face of the supporting part 4 on the opposite side to the thread of the tip 3a, so as to simultaneously sandwich the supporting part 4 and the adjacent part 5 between the shoulder and the nut 2a.

According to the invention, the nut 2a includes a first element 6a rotating relative to the tip 3a when screwing. In reference to FIGS. 1 to 3, this first element includes several sections that can be broken down from back to front into an area for rotatable engagement 7a by a screwing tool such as a wrench, a shoulder 8a formed on the periphery of the nut 2a, and a cylindrical part 9a, substantially extending the area for rotatable engagement 7a forwardly beyond the shoulder 8a. The area 7a has typically a prismatic external shape, for example a six-sided one. The first element includes an end-to-end through bore 10. A rear part 11 of the bore 10 is narrower and includes a thread 12 cooperating with that of the tip 3a when screwing.

The nut 2a includes a second element 13a having generally an annular shape located at a front end of the nut 2a. The second element 13a includes an internal shoulder 14a. The radially internal profile of the shoulder 14a is fitted around a front end of the cylindrical part 9a of the first element 6a and is retained forwardly by an axial stop 15a, typically an elastic ring.

As soon as the lug 17a is introduced into the housing 18, the second element 13a is rotatably engaged with the adjacent part 5, that is rotatably unmovable with the same. It is assumed in this case that the part 5 is itself rotatably unmovable with respect to the tip 3a. The second element 13a includes a radial extension 16a carrying a lug 17a extending axially in the screwing direction of the nut 2a, that is forwardly. The lug 17a is for being introduced into a housing 18 having a conjugated shape, for example a blind bore provided in the adjacent part 5. In the example illustrated in FIGS. 1 and 2, there are provided two housings 18 arranged at 180° around the axis X, preventing the second element 13a from being rotated one full rotation about the axis X before the lug 17a is positioned opposite the housing 18. Alternatively, a single housing could be enough.

Figure 3:
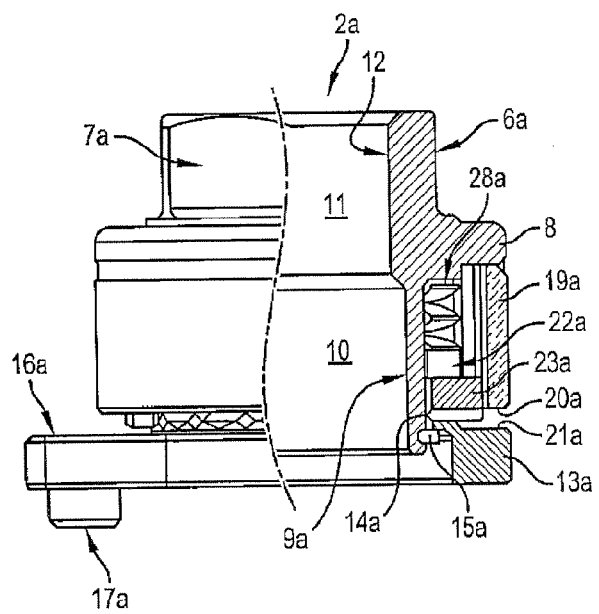
Figure 4:
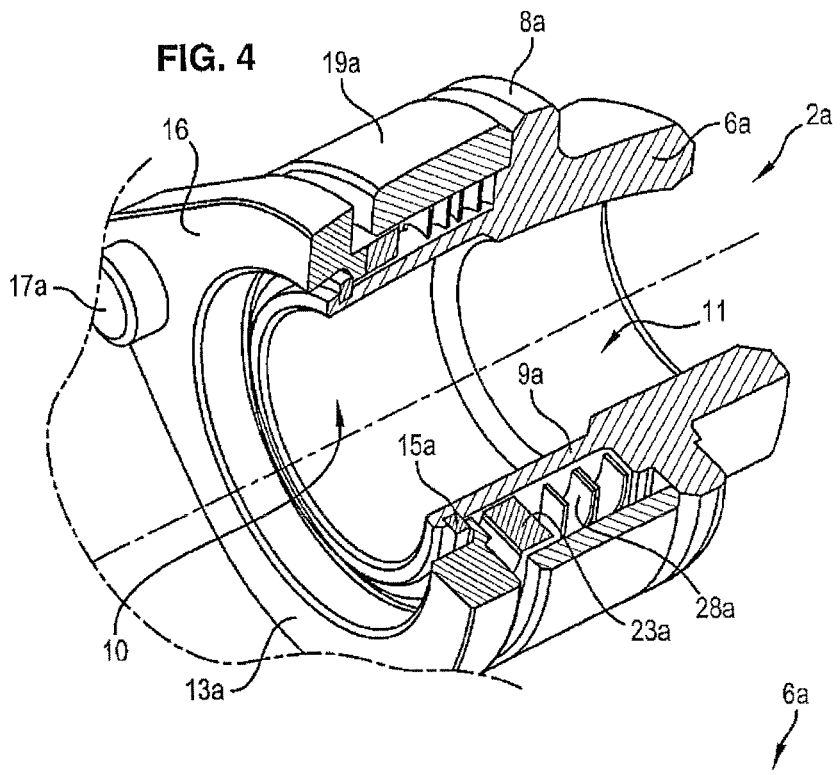

As can be seen in FIG. 3, the nut 2a also includes a supporting cylinder 19a fastened at its back end to a front face of the shoulder 8a. A face of the front end of the cylinder 19a makes up a first clamping surface 20a for axially engaging a second clamping surface 21a located in front of the same on a back face of the second element 13a. The supporting cylinder 19a forms a spacer restricting the advancement of the first element 6a with respect to the second element 13a when the nut 2a is being screwed onto the tip 3a. The cylinder 19a is for example welded to the shoulder 8a. A substantially annular or cylindrical throat 22a is provided between the cylindrical part 9a and the supporting cylinder 19a which bound this throat internally and externally, respectively.

Figure 5:
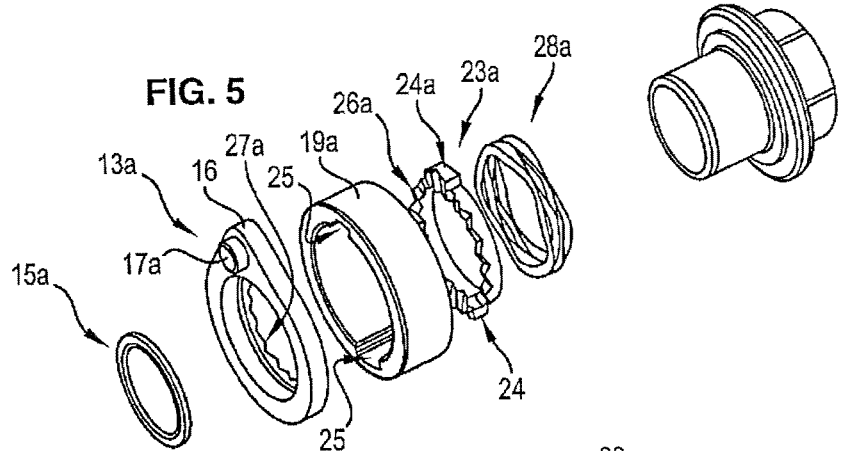

The nut 2a also includes a stop member 23a having generally an annular shape introduced into the throat 20a. The stop member 23a is rotatably secured to the first element 6a. For that purpose, the stop member 23a includes at least one radial protrusion 24a, typically two protrusions 24a as represented in FIGS. 1 to 5. These protrusions 24a are introduced and axially slide in grooves 25 having conjugated shapes provided in the thickness of the supporting cylinder 19a (FIG. 5). These protrusions have for example dovetail shapes, the flared zone of which is the farthest from the axis X, these protrusions being introduced into respective grooves having also a trapezoidal cross-section. Such a trapezoidal shape ensures an optimum guidance of the stop member when axially moved into the throat 22a.

According to the invention, the nut 2a also includes releasable coupling means 26a, 27a, 28a consisting of two groups of axially directed teeth, fastened for a first group to the stop member 23a, and for the second group to the second element 13a. One group of teeth 26a is provided on a front annular face of the stop member 23a and another group of teeth 27a is provided on a back annular face of the second element 13a facing said front face. The teeth have a triangular configuration and have more precisely an isosceles shape, that is have faces directed towards the other group of teeth and are of the same oblique slope. The teeth 26a of the stop member 23a and the teeth 27A of the second element 13a have complementary profiles such that they are interpenetrable when biased by the return means 28a provided in the throat 22a, urging the stop member 23a towards the second element 13a.

The first group of teeth 26a of the stop member 23a is rotatably driven with the first element 6a upon screwing the nut 2a, whereas the second group of teeth 27a of the second element 13a is rotatably unmovable. During this relative rotation between both groups of teeth, the latter are alternately in an interpenetration configuration and a tip to tip configuration. The passage from one configuration to the other is performed by a relative sliding of the respective adjacent faces of both groups of teeth. The stop member 23a thereby performs translations along the axis X alternately rearwardly and forwardly when screwing the nut 2a, this being similar to an oscillation movement. Each translation is performed on a stroke corresponding to the height of the teeth, the distance separating the tip of one tooth from the trough between two teeth, projected on the axial direction.

Figure 6:
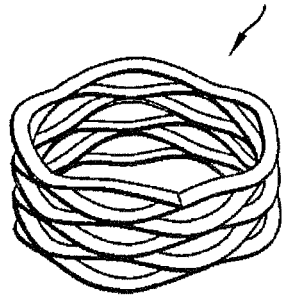
FIG. 6 represents a view of the spring integrated to the nut of FIG. 1.

The return means 28a are typically formed by a wavy compression spring, as illustrated in FIG. 6, working on a relatively small axial stroke, induced by alternated translations of the stop member 23a. The spring 28a rests on the one hand onto a shoulder of the first element 6a located at the bottom of the throat 22a, and on the other hand on a back face of the stop member 23a.

Screwing the nut 2a onto the tip 3a is performed the following way: as illustrated in FIG. 1, the nut is presented at the end of the threaded tip and then screwed thereto using an adapted wrench rotatably engaging the nut. At the beginning of the screwing, the second element is freely rotatable, and then moves closer to the adjacent part 5. When the nut 2a is being screwed, the second element 13a rotates about the axis X until the lug contacts the adjacent part 5. A further screwing of the nut further rotates the second element 13a, until the lug 17a clings onto the first of the housings 18 located on its trajectory, in view of the axial forward thrust. This indexing of the lug onto the mouth of the housing is automatically operated and generates a sensory effect perceived by the operator when screwing. The lug 17a once in this position, will then penetrate the housing 18 as the screwing proceeds further and the nut advances towards the adjacent part 5. The second element 13a is then rotatably unmovable with respect to the other parts of the nut 2a. Any further rotation of the first element 6a causes two effects: on the one hand, the first element 6a will advance in translation along the axis X towards the second element 13a, as long as there is nothing to stop this advancement. On the other hand, the coupling means are biased by the relative sliding between both groups of teeth 26a, 26b, which rotate with respect to each other at the same time as an oscillation of the stop member 23a is exerted against the thrust exerted by the return means 28a. Thrusts and releases are alternately performed in the contact between both groups of teeth. This results in a braking effect also called self-locking, preventing the nut 2a from being importunately unscrewed, since the same thrust and release phenomenon between the teeth is present when unlocking. To overcome the thrust of the spring, a rotation torque should be applied to the first element 6a, which is higher than a given threshold, so as to generate either locking, or unlocking.

The screwing proceeds until the second element 13a comes to press against the adjacent part 5 and the supporting cylinder 19a comes into contact with the second element 13a, by their respective clamping surface 20a, 21a, as shown in FIG. 2. A clamping torque is finally applied to the first element 6a, which is reflected by a suitable clamping directly exerted between the supporting cylinder 19a and the second element 13a.

Figure 7:
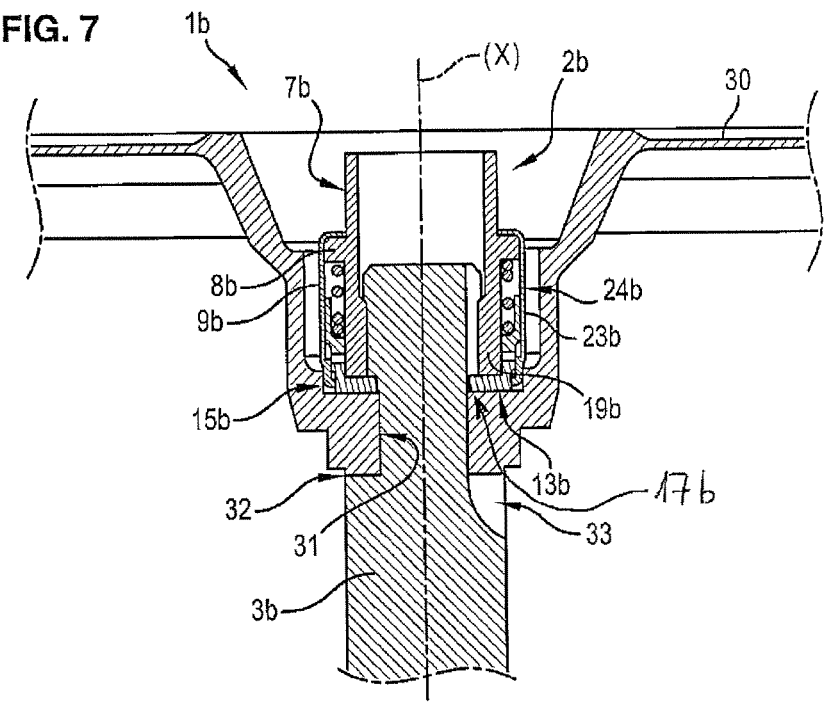
FIG. 7 represents an assembly of one part onto a threaded tip provided with a coupling device according to a second embodiment of the invention.
Figure 8:
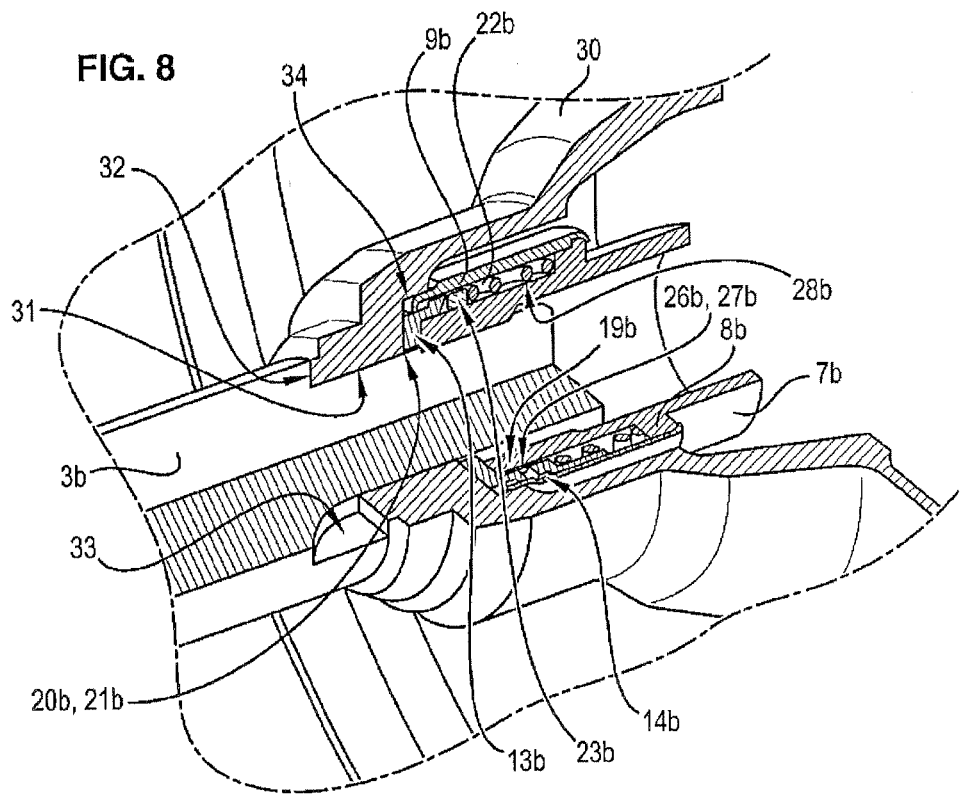
FIG. 8 represents a perspective view of the assembly of FIG. 7, with one quarter cut away in the longitudinal direction.

A second embodiment of the invention is presented in FIGS. 7 and 8 only with respect to the differences from the first embodiment. Elements having references with the same base number (for example 2a and 2b) have identical technical functions or effects in both embodiments.

In this second embodiment, the assembly is made between a rotating element 30 such as a pulley, a wheel, etc. and a tip 3b. The rotating element 30 includes a hub provided with a centre bore 31 enabling it to be fitted onto the tip end, to the point of coming to rest onto a shoulder 32 of the tip 3b. An anti-rotation device is provided between the rotating element 30 and the tip 3b, for example an internal radial protrusion in the bore of the rotating element, forming a key, introduced into a longitudinal groove 33 formed on the end of the tip 3b.

A first element of the nut 2b includes several sections which can be broken down from back to front in an area for rotatable engagement 7b using an adapted tool, a peripheral shoulder 8b and a supporting cylinder 19b.

The supporting cylinder 19b extends the area for rotatable engagement 7b beyond the peripheral shoulder 8b forwardly, that is in the screwing direction of the nut 2b.

The nut also includes a cover 9b having generally a cylindrical shape fastened to the peripheral shoulder 8b, and extending forwardly to a front end 34. A throat 22b having a substantially cylindrical shape is bounded on the one hand internally by the supporting cylinder 19b, and on the other hand externally by the cover 9b.

The nut includes a stop member 23b having generally an annular shape, introduced into the throat 22b. The stop member 23b includes rotating stops means consisting of at least one radial protrusion 24b axially sliding in a groove having a conjugated shape provided in the thickness of the cover 9b. This protrusion can for example have generally a dovetail shape having a flared part away from the axis X, ensuring an optimum guidance of the stop member 23b with respect to the cover 9b.

In this embodiment, the second element 13b has generally an annular shape having an external shoulder the radially external profile 14b of which is sandwiched between an axial stop 15b and the stop member 23b. The axial stop 15b consists of a shoulder or narrowed portion, in particular made by crimping, extending radially towards the axis X, so as to trap the second element 13b into the throat 22b.

As in the first embodiment, the second element 23b includes rotating stop means with respect to the first element 6b, consisting of at least one radially internal protrusion penetrating a longitudinal groove provided to the tip 3b, so as to set a key type link. The groove can advantageously be the groove 33 rotatably locking the rotating element 30.

Coupling means 26b, 27b, 28b consist of a first group of teeth 26b provided on a front annular face of the stop member 23b, and a second group of teeth 27b provided on a back annular face of the second element 13b.

A compression spring 28b such as a coiled spring is provided in the throat 22b, and rests on a bottom of the throat 22b to push the stop member 23b towards the second element 13b, so as to generate the interpenetration of the teeth. In an alternative not shown, a wavy spring is also suitable.

As in the first embodiment, direct clamping surfaces are provided between two constituent elements of the nut 2b, that is a front annular face of the supporting cylinder 19b, and a back annular face of the second element 13b. The supporting cylinder 19b forms a spacer as in the first embodiment, by restricting the advancement of the first element 6b to the second element 13b, and allows a direct transmission of the clamping force between the first element and the second element being rotatably unmovable.

The operating principle of this second embodiment is similar to the first embodiment and will not be described in more details.

Schematically, the first and second embodiments are especially different in that:
- the supporting cylinder is located outside the coupling means in the first embodiment, whereas it is located inside the coupling means in the second embodiment,
- the rotating stop of the second element is performed via the adjacent part in the first embodiment whereas it is directly performed on the threaded tip in the second embodiment,
- the axial stop of the second element is performed by a cylindrical part and an elastic ring in the first embodiment whereas it is performed by a narrowed part of the cover in the second embodiment.

Of course, the invention is not restricted to the means just described and includes all and any technical equivalents.

The invention claimed is:

1. A self-locking screwing attachment device including a nut screwed onto a threaded tip extending along a screwing axis, characterised in that the nut includes:
    a first element rotating relative to the tip during screwing,
    a second element rotatably engaged with the tip or an adjacent part to be assembled, the tip passing therethrough,
    a stop member rotatably secured to the first element,
    a releasable coupling means between the stop member and the second element, this coupling means consisting of two groups of axially directed teeth, secured for a first group to the stop member, and for the second group to the second element, the nut being further provided with an area for direct clamping of a first clamping surface of the first element and a second clamping surface of the second element against each other, when the second element axially engages the tip or said adjacent part to be assembled, the second element being movable in the axial direction with respect to the first element, between an axial stop carried by the first element and the stop member.

2. The device according to claim 1, characterised in that the stop member is urged towards the second element by return means resting on the first element, and being driven in translation along the axis against the return means with respect to the first element, under the influence of the second element, as the nut is moved along the axis during screwing, when the second element axially engages the tip or said adjacent part to be assembled.

3. The device according to claim 2, characterised in that the teeth of the second element and the stop member are interpenetrable when biased by the return means.

4. The device according to claim 3, characterised in that the second element has generally an annular shape a back face of which with respect to the screwing direction supports part of the teeth of the coupling means, the second element having an inner shoulder the radially inner profile of which is sandwiched between the axial stop and the stop member.

5. The device according to claim 3, characterised in that the second element has generally an annular shape a back face of which with respect to the screwing direction supports part of the teeth of the coupling means, the second element having an outer shoulder the radially outer profile of which is sandwiched between the axial stop and the stop member.

6. The device according to claim 5, characterised in that the axial stop is formed by a shoulder, or a narrowed portion in particular made by crimping, extending radially to inside the nut so as to trap the second element in the throat.

7. The device according to claim 2, characterised in that the return means are of the compression spring type, in particular of the wavy type.

8. The device according to claim 2, characterised in that the return means are of the compression spring type, in particular a coiled spring.

9. The device according to claim 1, characterised in that the first element includes an area for being rotatably engaged by a screwing tool, said area axially bounded by a back end of the nut with respect to the axial screwing direction, and by a shoulder formed on the periphery of the nut.

10. The device according to claim 9, characterised in that the nut includes a supporting cylinder secured at a back end thereof to a front face of the shoulder, a face of the front end of the cylinder making up the first clamping surface of the first element.

11. The device according to claim 10, characterised in that the stop member has generally an annular shape introduced into a throat having a substantially cylindrical shape, bounded on the one hand internally by a cylindrical part substantially extending the area for rotatable engagement beyond the peripheral shoulder, in the screwing direction of the nut, and on the other hand externally by the supporting cylinder, the stop member further including rotating stops means consisting of at least one radial protrusion, for example having generally a dovetail shape axially sliding in a groove having a conjugated shape provided in the thickness of the supporting cylinder, a front face of the stop member with respect to the screwing direction supporting part of the teeth of the coupling means.

12. The device according to claim 9, characterised in that the nut includes a supporting cylinder extending the area for rotatable engagement beyond the peripheral shoulder in the axial screwing direction of the nut, wherein a front end of the supporting cylinder includes a face making up the first clamping surface of the first element.

13. The device according to claim 12, characterised in that the stop member has generally an annular shape introduced into a throat having a substantially cylindrical shape, bounded on the one hand internally by the supporting cylinder, and on the other hand externally by a cover having generally a cylindrical shape secured to the peripheral shoulder and extending in the screwing direction up to a front end, the stop member further including rotating stop means consisting of at least one radial protrusion, for example having generally a dovetail shape axially sliding in a groove having a conjugated shape provided in the thickness of the cover, a front face of the stop member with respect to the screwing direction supporting part of the teeth of the coupling means.

14. The device according to claim 1, characterised in that the second element includes at least one lug axially extending in the screwing direction of the nut, the lug being capable of introduction into a housing having a conjugated shape provided in the adjacent part to be assembled, so as to rotatably secure the second element to said element part.

15. The device according to claim 1, characterised in that the second element includes at least one radially inner protrusion penetrating a groove provided on the tip, so as to set a key type slide link and thus rotatably secure the second element to the tip.

16. An assembly between a support onto which is securely mounted a threaded tip and at least one adjacent part through which the tip passes, characterised in that it includes a self-locking screwing attachment device according to claim 1.

17. An assembly on a threaded tip of an adjacent part and securely rotatably mounted on the tip by a key system, the adjacent part being fitted onto the tip to the point of axially engaging a shoulder of the tip, characterised in that it includes a self-locking screwing attachment device according to claim 1.

\* \* \* \* \*